United States Patent [19]

Yonezawa

[11] Patent Number: 5,341,212

[45] Date of Patent: Aug. 23, 1994

[54] WAVE FRONT INTERFEROMETER

[75] Inventor: Tomohiro Yonezawa, Tokyo, Japan

[73] Assignee: Olympus Optical Company Limited, Japan

[21] Appl. No.: 918,203

[22] Filed: Jul. 20, 1992

[30] Foreign Application Priority Data

Jul. 19, 1991 [JP] Japan .................................. 3-204942
Jan. 24, 1992 [JP] Japan .................................. 4-034424

[51] Int. Cl.$^5$ ............................................ G01B 11/00
[52] U.S. Cl. ...................................... 356/359; 356/360
[58] Field of Search ............... 356/124, 345, 353, 359, 356/360

[56] References Cited

U.S. PATENT DOCUMENTS

| | | | |
|---|---|---|---|
| 4,280,764 | 7/1982 | Sica, Jr. et al. | 356/360 |
| 4,660,978 | 4/1987 | Wu | 356/359 |
| 4,707,137 | 11/1987 | Lee | 356/359 |
| 4,791,584 | 12/1988 | Greivenkamp, Jr. | 356/359 |
| 4,844,616 | 7/1989 | Kulkarni et al. | 356/359 |
| 4,978,219 | 12/1990 | Bessho | 356/359 |
| 5,020,901 | 6/1991 | de Groot | 356/345 |
| 5,042,949 | 8/1991 | Greenberg et al. | 356/359 |
| 5,129,724 | 7/1992 | Brophy et al. | 356/360 |

FOREIGN PATENT DOCUMENTS

| | | | |
|---|---|---|---|
| 288875 | 4/1991 | Fed. Rep. of Germany | 356/359 |
| 212831 | of 1986 | Japan . | |
| 144526 | of 1990 | Japan . | |
| 239433 | of 1990 | Japan . | |
| 21806 | of 1991 | Japan . | |
| 1337737 | 9/1987 | U.S.S.R. | 356/359 |

Primary Examiner—Robert J. Warden
Assistant Examiner—L. M. Crawford
Attorney, Agent, or Firm—Bruce L. Adams; Van C. Wilks

[57] ABSTRACT

A wave front interferometer for determining the shape of a surface from interference fringes has a light source which projects a light beam through a beam splitter disposed in an optical path between the light source and an optical surface whose shape is to be determined. The beam splitter bends a phase conjugate wave to become incident on the optical surface and to be reflected as a reflected beam. A phase conjugate mirror disposed in the optical path receives the light beam along a beam path through the beam splitter and reflects the light beam as the phase conjugate wave. The phase conjugate mirror reflects the light beam back along the same beam path so that the distance of the focus point of the light beam reflected from the phase conjugate mirror increases as the distance between the light source and the beam splitter and/or the phase conjugate mirror increases, so that either a convex or concave surface having a large radius of curvature can be measured. The reflected beam from the optical surface is effective as a measurement wave for determining the shape of the optical surface.

16 Claims, 13 Drawing Sheets

FIG.12
FIG.13
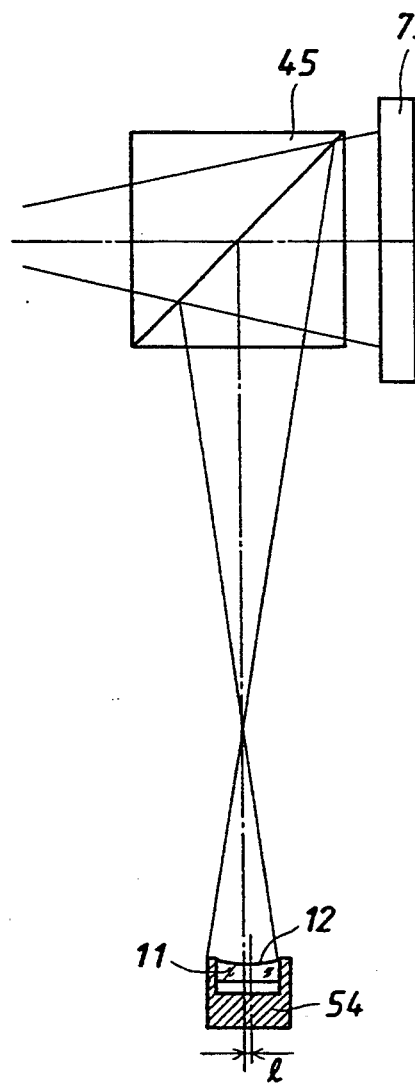
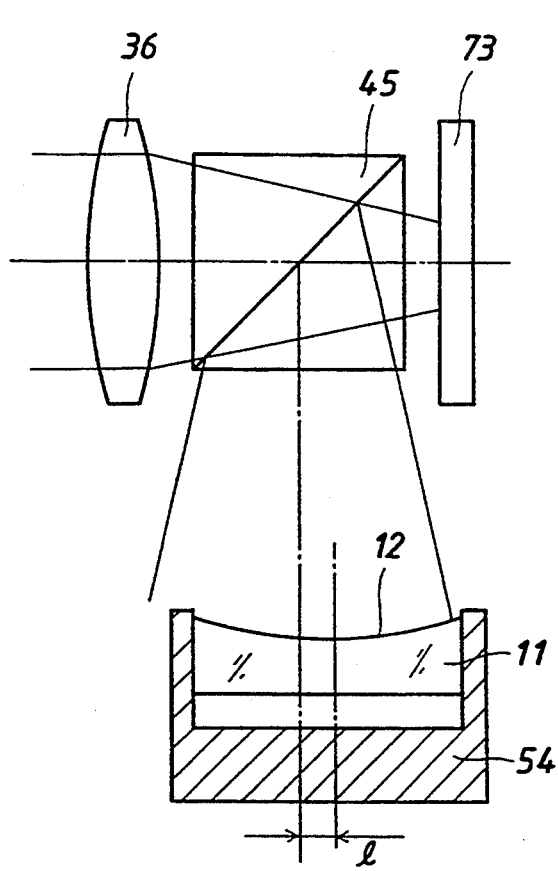

WAVE FRONT INTERFEROMETER

BACKGROUND OF THE INVENTION

1. Field of the Invention

The present invention pertains to a wave front interferometer which can determine the surface shape of an optical component.

2. Description of the Prior Art

An apparatus is known that utilizes optical interference to determine the shape of the optical surface of some object such as, an optical part. This conventional apparatus is described in Japanese Patent Publication No. H3-21806.

FIG. 17 illustrates the conventional interferometer disclosed in the above Publication. Light emitted from a laser light source (1) is focused through a condenser lens (2), and then diverted and reflected at a beam splitter (3). After forming a parallel beam through a collimator lens (4) and then forming a focusing beam through a condenser lens (5), the light beam is incident on an optical surface (12) of the lens to be examined (11) that is secured by a lens holder (10). The beam reflected on the surface (12) interferes with a beam reflected by the reference surface (5A) of the condenser lens (5), yielding interference fringes. The interference fringes are then observed using an observation mechanism (6), such as a telecamera, to determine the shape of the surface (12). However, the conventional interferometer has the problems described below.

In the construction of the conventional apparatus shown in FIG. 17, the laser beam needs to be vertically incident on the surface (12). It is also necessary to keep the optical system in a position relative to the laser light source (1) and the surface (12) such that an optical path is formed such that the condenser lens (5) may cause the laser beam to focus on a centripetal position (13) of the surface (12). FIGS. 18 and 19 illustrate such positional relationships for a concave and a convex surface, respectively.

As shown in FIG. 18, for a concave surface, the centripetal position (13) of the surface (12) is positioned between the optical system and the surface (12), thereby the distance between the condenser lens (5) and a surface (12) is greater than the radius of curvature of the surface (12). Consequently shape-determination becomes possible.

On the other hand, for a convex surface, as shown in FIG. 19, the centripetal position (13) of an optical surface (12) is outside of the optical system. In other words, beyond the surface (12). When the distance (L) between the reference surface (5A) of the condenser lens (5) and the focus position of the laser beam is smaller than the radius of curvature of the surface (12), there is no way to focus the laser beam on the centripetal position (13) of the surface (12). This makes shape determination impossible for a convex surface with a radius of curvature larger than the distance (L).

SUMMARY OF THE INVENTION

One objective of the present invention is to eliminate the above disadvantages and the attendant problems.

Another objective of the present invention is to provide a wave front interferometer with the ability to determine the shape of a convex surface with a large radius of curvature.

The present invention enables a wave front interferometer to determine the shape of an optical surface from interference fringes. The invention includes a beam splitter and a phase conjugate mirror which are in an optical path extending from a light source to said surface. The phase conjugate mirror receives a light beam from the light source through the beam splitter and reflects the light beam as a phase conjugate wave. The phase conjugate wave bends at the beam splitter and is incident and reflected as a reflected beam on the surface. The beam reflected on the surface is then used as a measurement beam (or "wave front") to determine the shape of the surface. There are two basic methods of forming the interference fringes. One method is to mix the reflected beam on the surface (or the "measurement beam") with a reference beam which has not reflected on the surface and observe the mixed beams. The other method is to divide the reflected beam on the surface (the "measurement beam") and split the divided beams from each other transversely before observation.

When an optical surface to be measured is convex, the measurable sizes of its radius of curvature (R) depend on the distance between the focusing point of the light beam deflected in the traveling direction by the beam splitter and the aspect of the beam splitter facing the surface to be measured. Because of the above-mentioned characteristics of a phase conjugate mirror, the light beam deflected in the traveling direction by the beam splitter becomes longer to the degree that either the assembly of the beam splitter and the phase conjugate mirror or the beam splitter gets further away from the radiant point (or further from each other) of a divergent light beam (the light source). This makes it possible to determine the shape of a convex surface with a larger radius of curvature than could be determined by conventional methods. The shape of a concave surface can be determined by using a convergent beam. It is also possible to determine the shape of a concave surface using a convergent beam incident on a phase conjugate mirror to form a divergent beam as a phase conjugate wave, and then having the divergent beam incident on the concave surface.

In the construction of the above wave front interferometer, components are arranged so that a laser beam emitted from a laser source may be perpendicularly incident on the optical surface to be measured while the incident laser beam reflects partly on the surface and travels backward along the path of the incident laser beam. When a part of the laser beam emitted from the laser source is introduced as a reference beam into the path of the reflected beam without impinging on the surface, the reflected beam and the reference beam interfere to form interference fringes. Also, when the reflected beam is divided into two and the two beams are split transversely as well, the beams interfere to form interference fringes. These interference fringes are used to determine the shape of the surface. Accordingly, the above procedures are effective for determining the shape of a convex surface with a radius of curvature larger than the distance form the top of the convex surface and the convergence point, which would be impossible using the prior art. They are equally effective for determining the shape of a concave surface as well.

BRIEF DESCRIPTION OF THE DRAWINGS

FIG. 12 is a schematic illustration showing a determination of the shape of a concave surface in accordance with the fourth embodiment;

FIG. 13 is a schematic illustration showing a determination of the shape of a concave surface in accordance with the fourth embodiment;

DETAILED DESCRIPTION OF THE PREFERRED EMBODIMENT

First Embodiment

Figure 1:
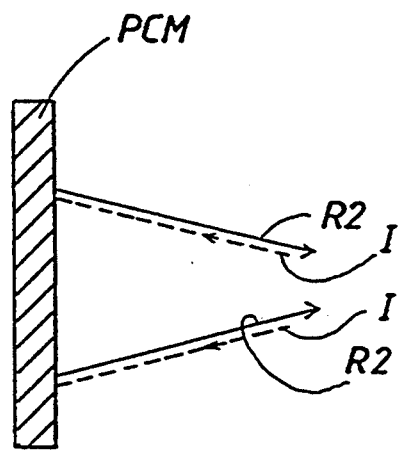
FIG. 1 is a sectional view showing the function of a phase conjugate mirror.
Figure 2:
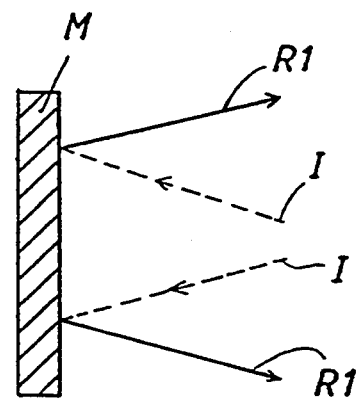
FIG. 2 is a sectional view showing the function of a normal mirror.

FIG. 1 is an illustration of how a divergent light beam (I) is incident on and reflected by a phase conjugate mirror (PCM) to become convergent light beam (R2). FIG. 2 is an illustration of how a divergent light beam (I) impinges and reflects on a normal flat mirror (M) to become divergent light beam (R1). In FIG. 1, the reflected convergent light beam (R2) is a phase conjugate wave, as a light beam reflecting on a phase conjugate mirror is called. The irradiation point of the divergent beam (I) is reached when the beam travels backward along the path of the divergent beam (I) impinging on the phase conjugate mirror PCM. Therefore, with an increase in the distance between the irradiation point and the phase conjugate mirror (PCM), the distance between the focusing point of the reflected beam (R2) and the phase conjugate mirror (PCM) becomes longer.

There are two types of phase conjugate mirrors (PCM): self-pumping and four-light wave mixing. In the self pumping phase conjugate mirror, a single incident beam generates a phase conjugate wave itself. In the four-light wave mixing phase conjugate mirror, an irradiation of both of two completely opposed beams (called "pumping waves") on both the incident face and the back face and the incidence of another beam (called a "probe wave") on the incident face generate a phase conjugate wave travelling backward along the path of the incident probe wave. The present invention applies to both types of phase conjugate mirrors.

Figure 3:
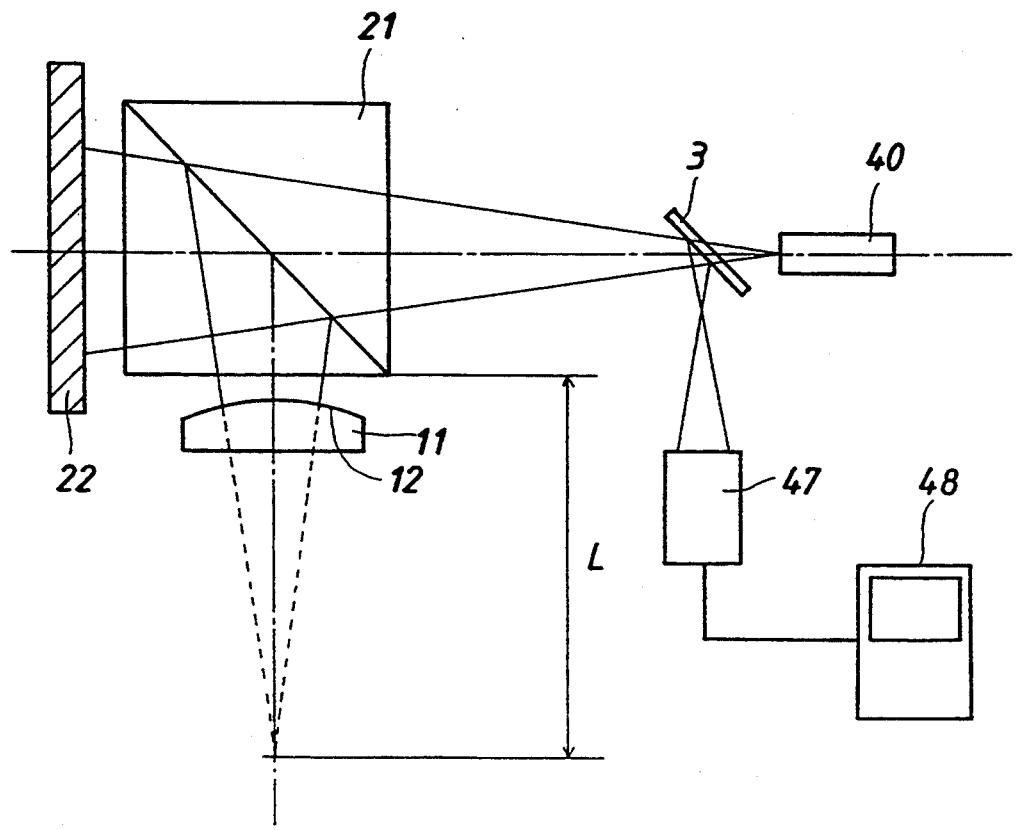
FIG. 3 is a schematic illustration of a wave front interferometer in accordance with the first embodiment of the present invention.
Figure 17:
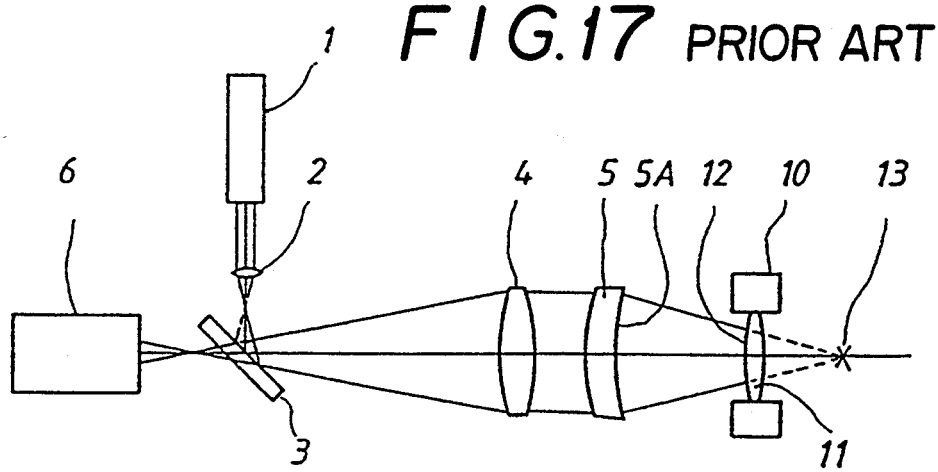
FIG. 17 is an illustration of a conventional wave front interferometer.
Figure 18:
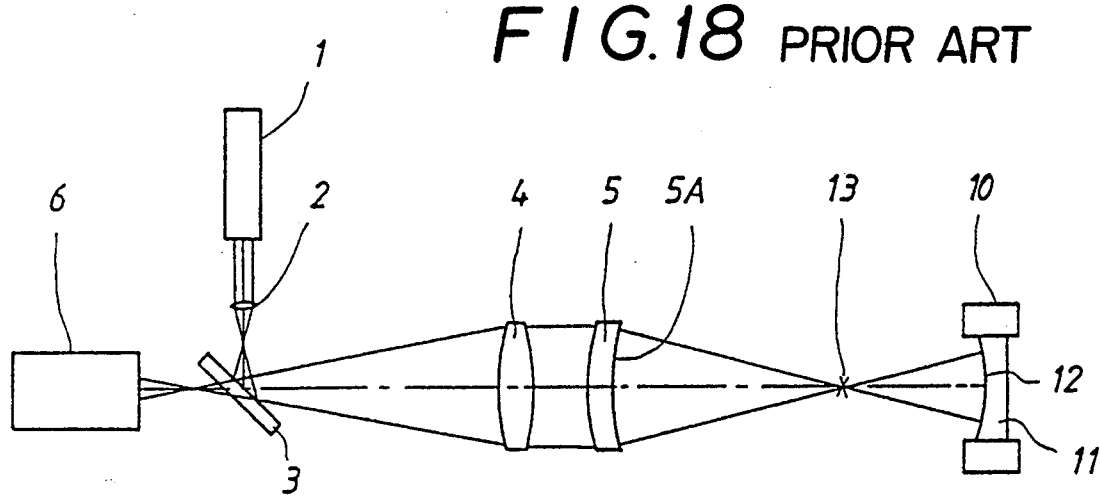
FIG. 18 is an illustration showing a determination of the shape of a concave surface in the conventional wave front interferometer.
Figure 19:
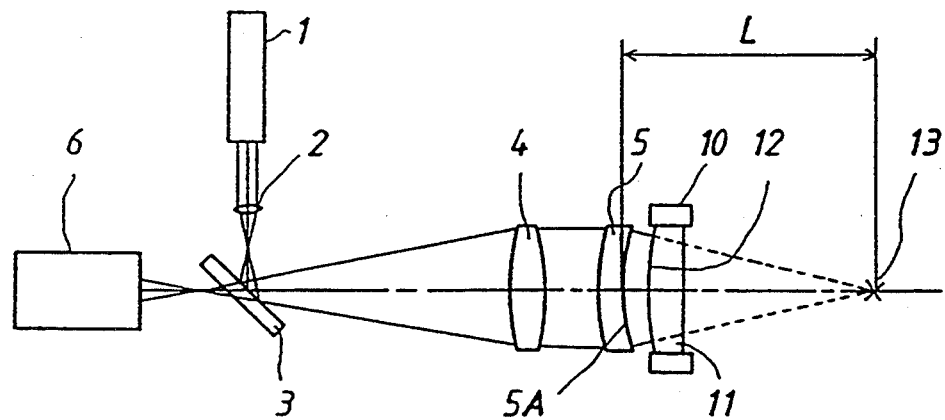
FIG. 19 is an illustration showing a determination of the shape of a convex surface in the conventional wave front interferometer.

FIG. 3 is a schematic illustration of a wave front interferometer in the first embodiment of the present invention. It contains a self-pumping phase conjugate mirror. The reference numerals in both FIG. 3 and FIG. 17 apply to the same elements. The reference numeral (40) indicates the He-Cd laser tube used as a laser source. Beam splitters (3) and (21) lie in the path of a laser beam emitted from the laser source (40). A phase conjugate mirror (22) lies behind the beam splitter (21). Reference numeral (11) indicates the lens whose optical surface is to be measured (12). The beam splitter (21) guides the laser beam reflected by the phase conjugate mirror (22) to the lens (11) but in a different direction than the beam splitter (3). A telecamera (47) to observe the interference fringes is placed in the path of the beam deflected onto the beam splitter (3). A monitor (48) is connected to the telecamera (47) to display the interference fringes observed by the telecamera (47). The phase conjugate mirror (22) is made of an SBN ($Sr_{1-x}Ba_x Nb_2O_6$) crystal and serves as a standard reference face.

In the above construction, a laser beam is emitted from the laser source (40), transmitted through the beam splitter (3), and then enters the beam splitter (21). The part of the laser beam entering the beam splitter (21) impinges on the phase conjugate mirror (22). As described earlier, when a divergent beam is incident on the phase conjugate mirror (22), it is reflected as a phase conjugate wave and travels as a convergent beam backward exactly along the path of the incident beam. A part of the reflected convergent beam on the phase conjugate mirror (22) enters the beam splitter (21), where it is deflected by 90 degrees in the travelling direction and impinges on the official surface 12 of the lens (11) to be measured.

In this construction, the measurable values of the radius of curvature (R) of the surface (12) are controlled by a distance (L) between the focusing point of the laser beam deflected in the traveling direction by the beam splitter (21) and that face of the beam splitter (21) facing the surface (12). However owing to such characteristics of the phase conjugate mirror (22) as described earlier, an increase in the distance from the assembly of the beam splitter (21) and the phase conjugate mirror (22) from the beam splitter (3) leads to an increase in the distance (L) of the laser beam deflected in the travelling direction by the beam splitter (21). Therefore, a larger distance between the beam splitters (3) and (21) makes it possible to determine that the shape of the surface (12) is convex and has a large radius of curvature. Increasing the distance from only the beam splitter (21), instead of from the entire assembly, is equally effective in determining shape.

In the above construction, the laser beam is perpendicularly incident on the surface (12), and a part of it is reflected and travels backward along the path of the incident laser beam. A part of the reflected beam is deflected by the beam splitter (3) and enters the telecamera (47). At the same time, a part of the laser beam reflected by the phase conjugate mirror (22) and then incident on the beam splitter (21) is transmitted through the beam splitter (21) and then enters the beam splitter (3). A part of the impinging beam is deflected by the beam splitter (3) and enters the telecamera (47). That part of the beam reflected by the surface (12) impinging on the telecamera (47) interferes with the part of the beam reflected by the phase conjugate mirror (22) which impinges on the telecamera (47) to form interference fringes on the telecamera (47). The interference fringes may be observed on the monitor (48) to determine the shape of the surface (12).

Thus, in the first embodiment, it is possible to determine the shape of a convex surface with a larger radius of curvature than could be treated in the prior art. In addition, the relatively small number of constituent elements in the wave front interferometer in this embodiment makes for a simple construction, and the use of a telecamera makes it possible to observe low-intensity interference fringes. Another unique advantage of this embodiment is that it eliminates the necessity for a reference lens by using beams of reflected light both from the surface (12) and from the phase conjugate mirror (22) to generate interference fringes.

Second Embodiment

Figure 4:
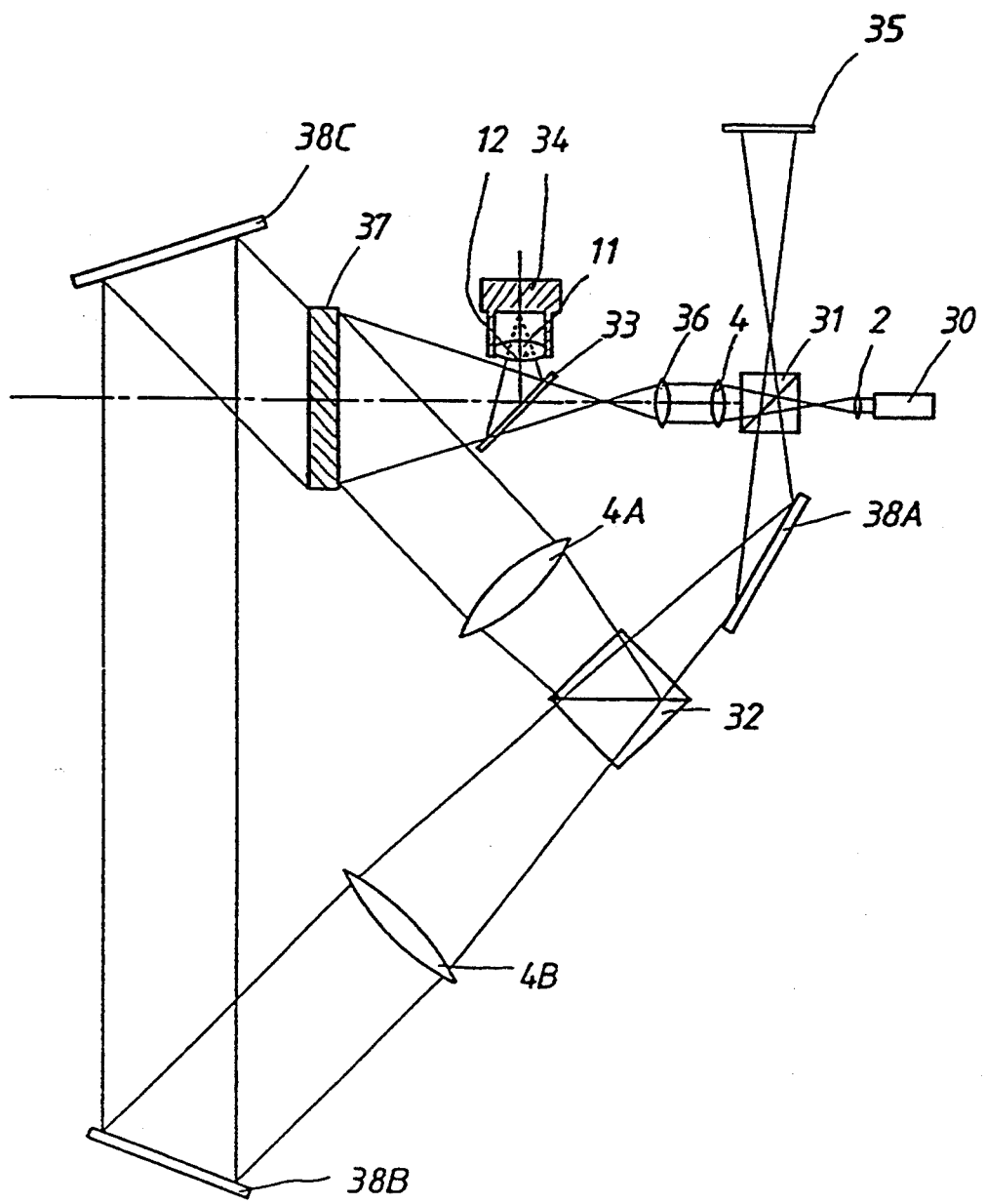
FIG. 4 is a schematic illustration of a wave front interferometer in accordance with the second embodiment of the present invention.

FIG. 4 is a schematic illustration of a wave front interferometer in accordance with the second embodiment of the present invention.

In the second embodiment, a four-light wave mixing phase conjugate mirror and an He-Ne laser tube as a laser source (30) are used. A condenser lens (2), a beam splitter (31), a collimator lens (4), a condenser lens (36), a half mirror (33) which forms an assembly with the beam splitter (31), and a phase conjugate mirror (37) made of a BaTiO3 crystal are positioned along the straight optical path from the laser source. The condenser lens (36) has not reference face. Along the path of the beam deflected by the beam splitter (31) are positioned a mirror (38A), a beam splitter (32), a collimator lens (4B), and a mirror (38B). Along the optical path between the beam splitter (32) and the phase conjugate mirror (37), a collimator lens (4A) is inserted, and a mirror (38C) is positioned behind the phase conjugate mirror (37) as an extension of the last optical path disposed. In this construction, the beam splitter (32) and the mirrors (38A), (38B), and (38C) help to make two laser beams incident on the phase conjugate mirror (37) in opposite directions, or in other words, at a 180 degrees angle of to each other. The lens to be examined (11) is supported by a support member (34), which is able to move both along the optical path and perpendicular to it. The reference numeral (35) indicates a screen for observing the interference fringes.

In the above construction, a laser beam emitted from the laser source (30) diverges after being condensed by the condenser lens (2) and enters the beam splitter (31). A part of the entering laser beam deflected by the beam splitter (31), is reflected by the mirror (38A), and then enters the beam splitter (32), where the entering beam is divided into a deflected beam and a transmitted beam. The deflected beam is made parallel by the collimator lens (4A) and then impinges on the phase conjugate mirror (37). At the same time, the transmitted beam is made parallel by the collimator lens (4B), reflected by the mirrors (38B) and (38C), and then impinges on the phase conjugate mirror (37) in a direction opposite to that of the beam incident on the phase conjugate mirror (37) after being deflected by the beam splitter (32) and transmitted through the collimator lens (4A). The two laser beams incident on the phase conjugate mirror (37) serve as a pumping waves to help generate a phase conjugate wave.

A part of the laser beam emitted from the laser source (30) enters the beam splitter (31) is transmitted through the beam splitter (31), made parallel by the collimator lens (4), and temporarily convergent by the condenser lens (36), soon diverges and then impinges on the half mirror (33). The part of the beam impinging on the half mirror (33) is transmitted through the half mirror (33) and is incident on the phase conjugate mirror (37). The incident beam becomes a probe wave and generates, with the aid of the other two completely opposed beams serving as pumping waves, a phase conjugate wave as a reflected light. The incident beam on the phase conjugate mirror (37) is a divergent beam, but the reflected light is a convergent beam, thanks to the characteristics of the phase conjugate mirror (37). A part of the reflected light, generated at the phase conjugate mirror (37), is bent in its travel path by the half mirror (33) to impinge on the surface to be measured (12).

Another part of the reflected light is transmitted through the half mirror (33), returns in exactly the opposite direction to the incident beam, passes through the condenser lens (36) and the collimator lens (4), and enters the beam splitter (31). A part of the entering beam is deflected by the beam splitter (31) and reaches the screen (35). At the same time, that part of the reflected light impinging on the surface (12) is partly reflected by the surface (12), then has the path of its travel partly diverted by the half mirror (33), and again impinges on the phase conjugate mirror (37) to generate a phase conjugate wave as a reflected light which reaches the half mirror (33). The light which reaches the half mirror (33) is partly transmitted through the half mirror (33), passes through both the condenser lens (36) and the collimator lens (4), and enters the beam splitter (31). The entering beam is partly deflected by the beam splitter (31) and reaches the screen (35). Thus, the screen receives two types of reflected light: one is the light reflected by the phase conjugate mirror (37) (which can be used as a standard reference surface), and the other is the light reflected by the surface (12). These two types of reflected light interfere with each other to form interference fringes on the screen (35). The shape of the surface (12) can be determined by observing the interference fringes.

Thus, in the second embodiment, the elements of the wave front interferometer for determining the shape of a convex surface should be positioned as is shown in FIG. 4. The surface to be measured (12) is positioned with a sliding mechanism of the support member (34) so that the reflected light from the phase conjugate mirror (37) can focus on the center of curvature of the convex surface. A larger distance between the condenser lens (36) and the half mirror (33) makes it possible to determine the shape of a convex surface with a larger radius of curvature.

Figure 5:
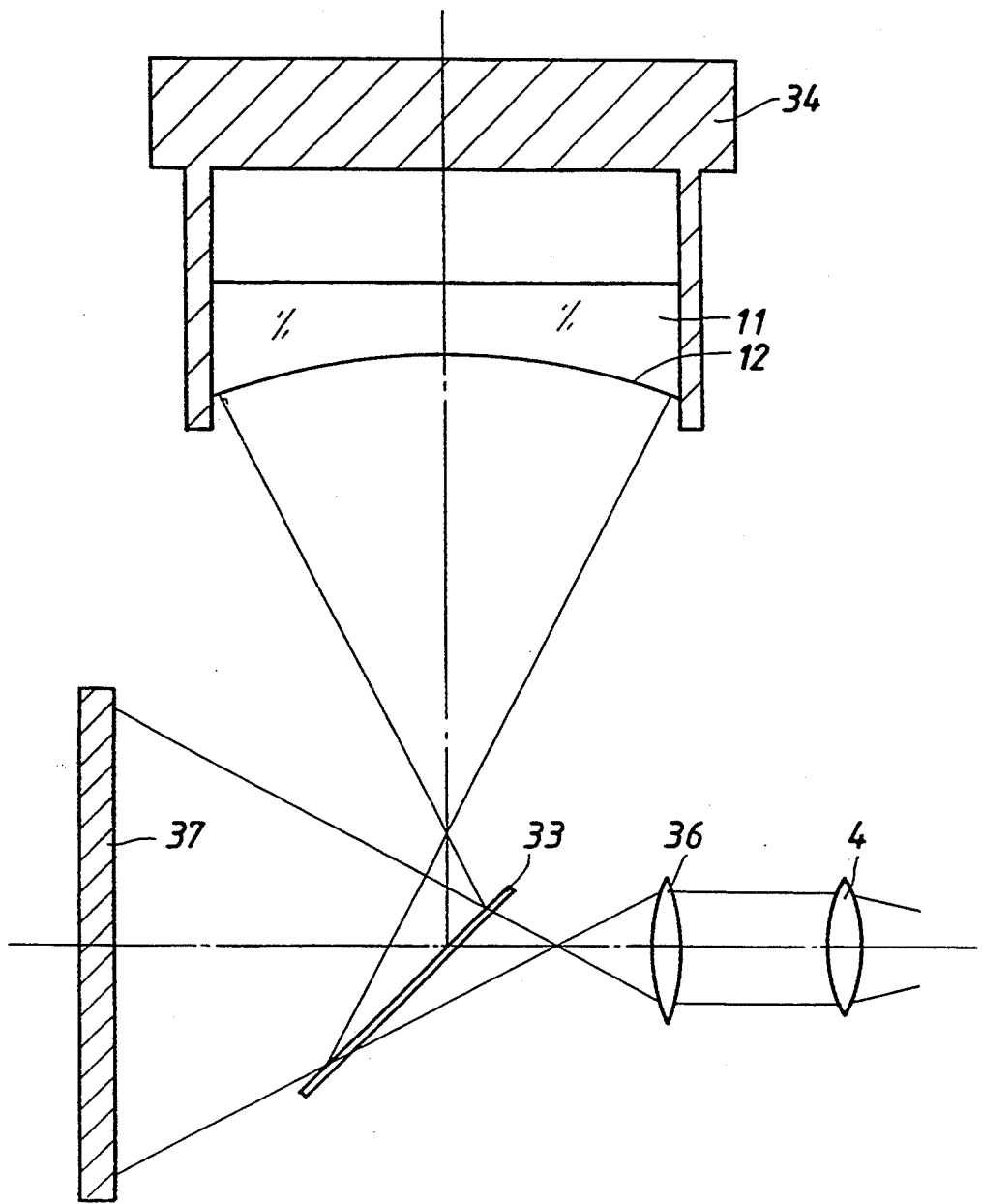
FIG. 5 is a schematic illustration showing a determination of the shape of a concave surface in the second embodiment.
Figure 6:
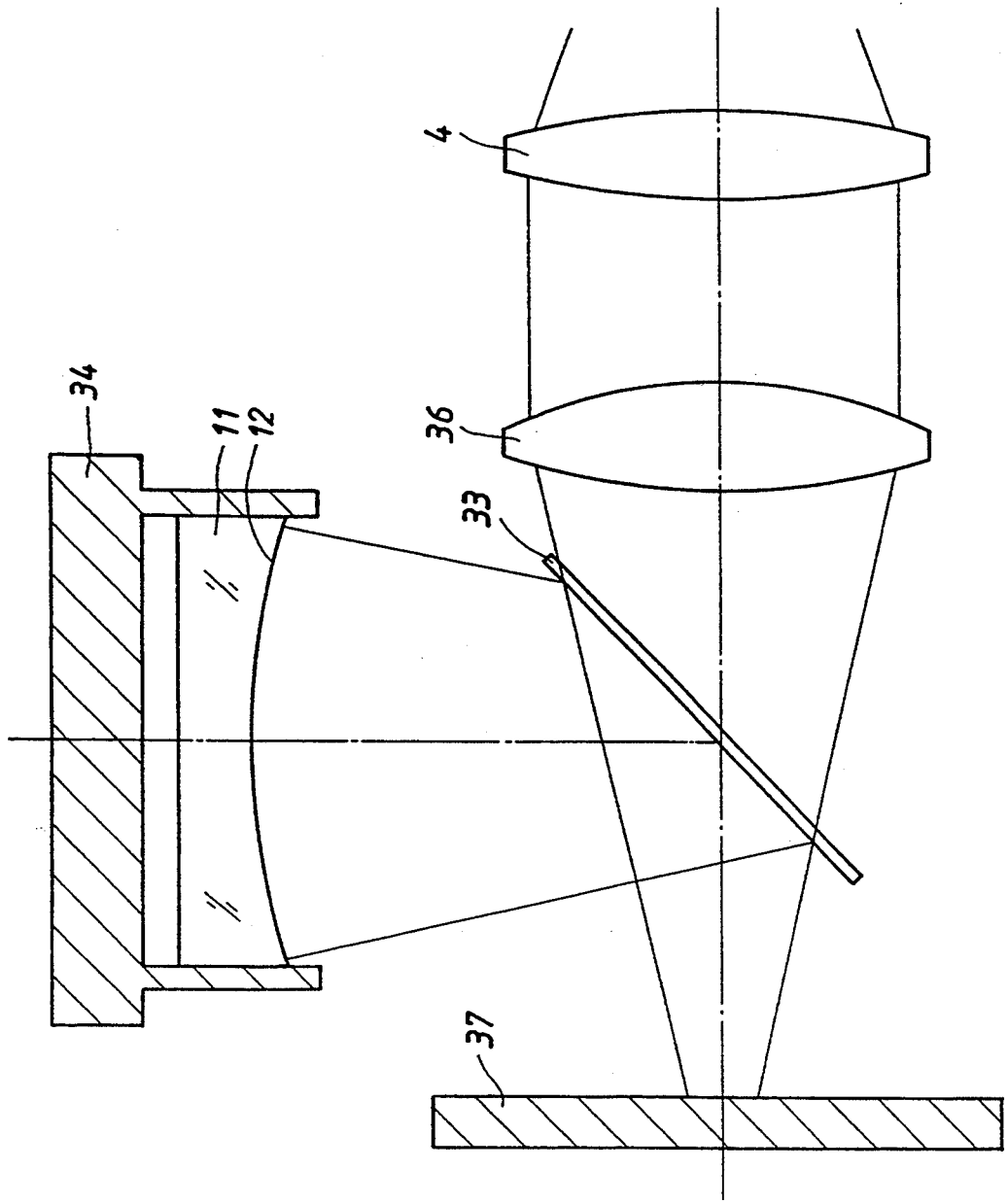
FIG. 6 is a schematic illustration showing a determination of the shape of a concave surface in the second embodiment.

Some of the elements of the wave front interferometer for determining the shape of a concave surface are disposed as is shown in FIG. 5 or 6. FIG. 5 corresponds to a case in which a divergent light is incident on the phase conjugate mirror (37). In FIG. 5, the surface to be measured (12) is separated further from the half mirror (33) than for the convex surface shown in FIG. 4. Therefore the reflected light from the phase conjugate mirror (37) can focus on the surface's center of curvature (12). This positioning is made by adjusting the support member (34). FIG. 6 corresponds to a case in which a convergent light is incident on the phase conjugate mirror (37). In FIG. 6, both the half mirror (33) and the phase conjugate mirror (37) are closer to the condenser lens (36), and the mirrors (38A), (38B), and (38C) and the collimator lenses (4) and (4B) are repositioned in FIG. 4, so that the focusing position of the reflected light from the phase conjugate mirror (37) may coincide with the center of curvature of the surface (12). In FIG. 6 the reflected light from the phase conjugate mirror (37) is a conjugate wave and divergent. Thus, in the second embodiment, determination of the shape of a concave surface is possible whether one uses a convergent light or a divergent light as the incident light on the phase conjugate mirror (37).

As in the first embodiment, one advantage of the second embodiment is that the necessity of using a reference lens is eliminated because light reflected from the surface (12) interferes with light reflected by the phase conjugate mirror (37), without requiring the use of a reference lens to generate interferences fringes. Another advantage is that the incidence of pumping waves on the phase conjugate mirror (37) can generate a phase conjugate wave more often than a self-pumping phase conjugate mirror does by itself. Instead of the beam splitter (32), collimator lens (4B), and mirrors (38B) and (38C) in FIG. 4, an arrangement of mirrors (38D) and (38E) such as shown in FIG. 7 is equally effective for causing pumping waves to be incident on a phase conjugate mirror.

Figure 7:
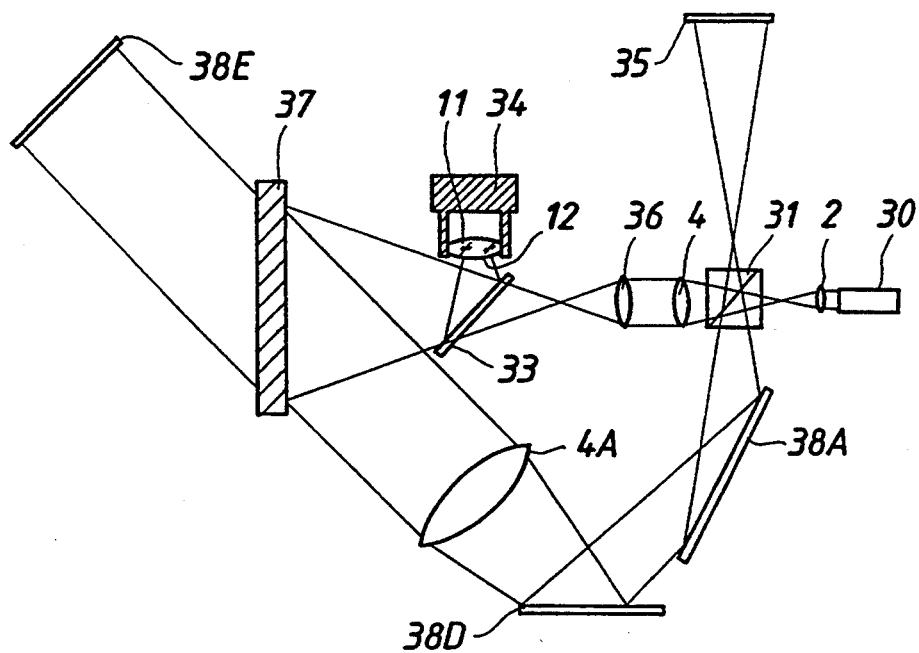
FIG. 7 is an illustration of a modification of the second embodiment.

In FIG. 7, a laser beam deflected by the beam splitter (31) is reflected by the mirror (38D) and emerges parallel from the collimator lens (4A), while the parallel beam is incident on the phase conjugate mirror (37). A part of the parallel beam is transmitted through the phase conjugate mirror (37) and impinges on the mirror (38E). Since the angle of the mirror (38E) is preset at a right angle, the impinging parallel beam incident on the mirror (38E) is reflected by the mirror (38E) along the same path and is again incident on the phase conjugate mirror (37). Thus, the two parallel beams are simultaneously incident on the phase conjugate mirror (37) and serve as pumping waves to help generate a phase conjugate wave as reflected light on the phase conjugate mirror (37). The rest of the construction of the wave front interferometer in FIG. 7 is the same as the one in FIG. 4. The whole construction of the wave front interferometer in FIG. 7 may be smaller than that in FIG. 4.

Third Embodiment

Figure 8:
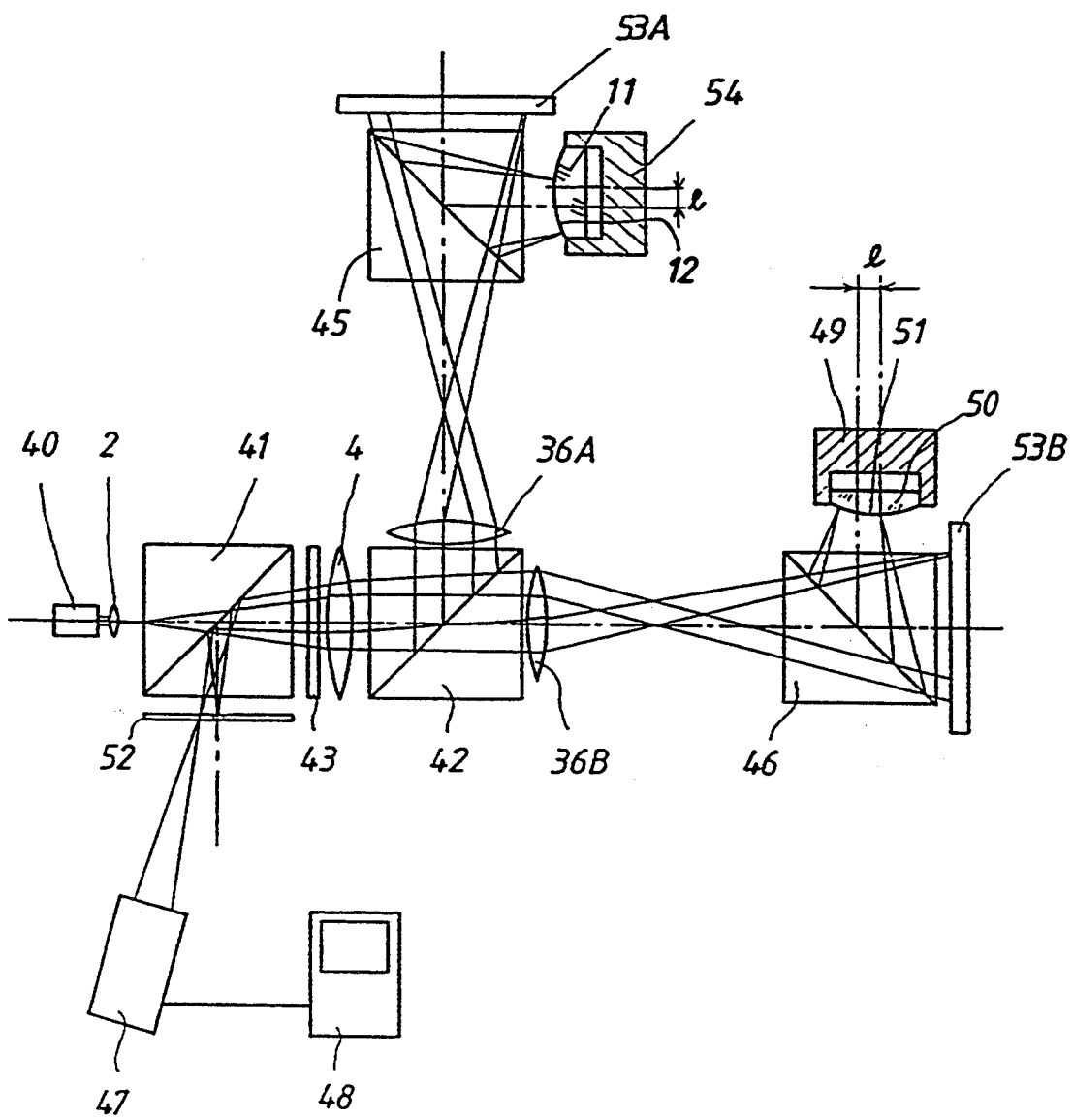
FIG. 8 is a schematic illustration of a wave front interferometer in accordance with the third embodiment of the present invention.

FIG. 8 is a schematic illustration of the outline of a wave front interferometer in accordance with the third embodiment of the present invention.

In the third embodiment, self-pumping phase conjugate mirrors are used. A laser source (40) comprising an He-Cd laser tube emitts a P-polarized light beam. Along the path of the P-polarized light beam are disposed a condenser lens (2), a polarized light beam splitter (41), a quarter undulation plate (43), a collimator lens (4), an unpolarized light beam splitter (42), a condenser lens (36B), an unpolarized light beam splitter (46), and a phase conjugate mirror (53B), in this order. The phase conjugate mirror (53B) is of the self-pumping type and made of SBN ($Sr_{1-x}Ba_xNb_2O_6$). Along the path of the light reflected on the unpolarized light beam splitter (42) are disposed a condenser lens (36A), an unpolarized light beam splitter (45), and a phase conjugate mirror (53A) in this order. The phase conjugate mirror (53A) is self-pumping and made of SBN ($Sr_{1-x}Ba_xNb_2O_6$). Along the path of the light reflected by the polarized light beam splitter (41), a mask (52) for shading that part of the light lying in the vicinity of the optical axis is positioned in such a way that it is optically conjugate with the focusing position of a laser beam through the condenser lens (2). The mask (52) may be formed by evaporating a shading material, such as chromium, on the central portion of a glass plate.

Along the path of the light deflected by the unpolarized light, beam splitters (45) and (46) support members (54) and (49), respectively, are positioned. They can be moved both along the optical axis and perpendicual to it. The support member (54) supports a lens (11) with an optical surface to be measured (12), and the support member (49) supports a reference object (or reference lens) (50) with a reference surface to be measured (51). In the actual measurement, the centripetal positions of the surface (12) and the reference surface (51) are deviated further away from each other, by a quantity of 1 from the respective optical axis of the interferometer. The reference numeral (47) indicates a telecamera pointed away from the optical axis of the interferometer. The numeral reference (48) indicates a monitor for displaying an image taken by the telecamera (47).

In the above construction of the third embodiment, a laser beam emitted from the laser source (40) is once condensed by the condenser lens (2), diverges again, and enters the polarized light beam splitter (41). Since the laser beam is P-polarized, the entering laser beam is transmitted through the polarized light beam splitter (41) and then is incident on the quarter undulation plate (43), thereby changing its polarization state from P-polarized light to circularly polarized light. The circularly polarized light beam becomes parallel through the collimator lens (4) and is divided into two beams of the same intensity by the unpolarized light beam splitter (42). The two beams are incident on the condenser lenses (36A) and (36B), converge through the condenser lens (36A) and (36B), and then diverge again before entering the unpolarized light beam splitters (45) and (46). A part of each of the last entering beams is transmitted through the unpolarized light beam splitters (45) and (46) and is incident on the phase conjugate mirrors (53A) and (53B). Since the phase conjugate mirrors (53A) and (53B) are self-pumping phase conjugate mirrors, incidence of the beams on the phase conjugate mirrors (53A) and (53B) leads immediately to the generation of phase conjugation waves as reflected light. In a case of the incidence of divergent beams on the phase conjugate mirrors (53A) and (53B), as is shown in FIG. 8, the reflected light beams are convergent beams. The reflected light on the phase conjugate mirrors (53A) and (53B) is partly transmitted through the unpolarized light beam splitters (45) and (46) and reaches the quarter undulation plate (43) after passing backward through the path the incident beams have taken. Through the quarter undulation plate (43) the beams change their polarization state from circularly polarized light to S-polarized light, are deflected by the polarized light beam splitter (41), and focus at an optically conjugate position with the focusing position of a laser beam by the condenser lens (2).

However, at the optically conjugate position the mask (52) is positioned to shade the light in and around the optical path. The light reflected on the phase conjugate mirrors (53A) and (53B) is partly deflected by the unpolarized light beam splitters (45) and (46), where the optical path of the light beams is bent by a right angle. After being bent, one of the beams is incident on the surface to be measured (12), and the other is incident on the reference surface (51). The incident beams are partly reflected by the surface (12) and by the reference surface (51). Since the centripetal positions of the surface (12) and the reference surface (5) are not on the optical axis but deviate from it by a quantity of 1, the partly reflected beams have different paths from those of the incident beams. The partly reflected beams are partly deflected by the unpolarized light beam splitters (45) and (46), are reflected on the phase conjugate mirrors (53A) and (53B), are transmitted through the unpolarized light beam splitters (45) and (46), enter the condenser lenses (36A) and (36B) parallel, and enter the unpolarized light beam splitter (42). The beam originating from the surface (12) is deflected by the unpolarized light beam splitter (42), and the beam originating from the reference surface (51) is transmitted through the unpolarized light beam splitter (42). Both beams reach the collimator lens (4).

Since the centripetal positions of the surface (12) and the reference surface (51) deviate further from each other, by the quantity of 1 from the respective optical axis, the paths of the two beams coincide as they reach the collimator lens (4). The two beams converge through the collimator lens (4), and are incident on the quarter undulation plate (43), changing their polarization state from circularly polarized light to S-polarized light. The two S-polarized light beams are deflected by the polarized light beam splitter (41), are transmitted through the mask (52), and reach the image receiving screen of the telecamera (47). On the telecamera screen the two beams, originating as reflected light from the surface (12) and the reference surface (51), interfere with each other to form interference fringes. The fringes are observed on the monitor (48) connected to the telecamera (47) to determine the shape of the surface (12).

Figure 9:
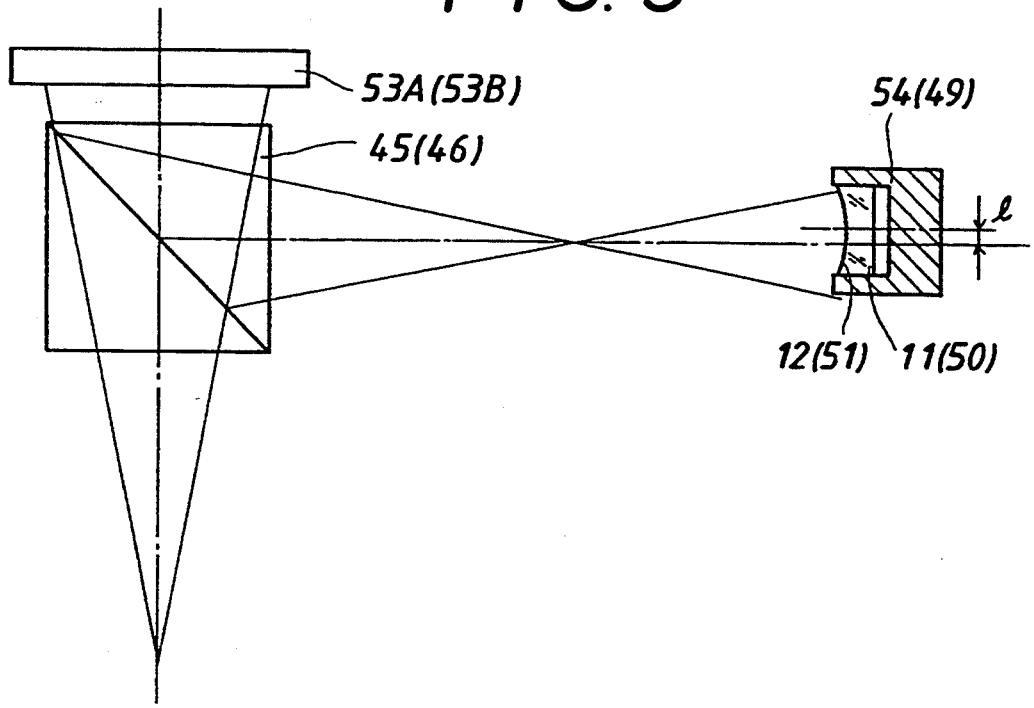
FIG. 9 is a schematic illustration showing a determination of the shape of a concave surface in accordance with the third embodiment.
Figure 10:
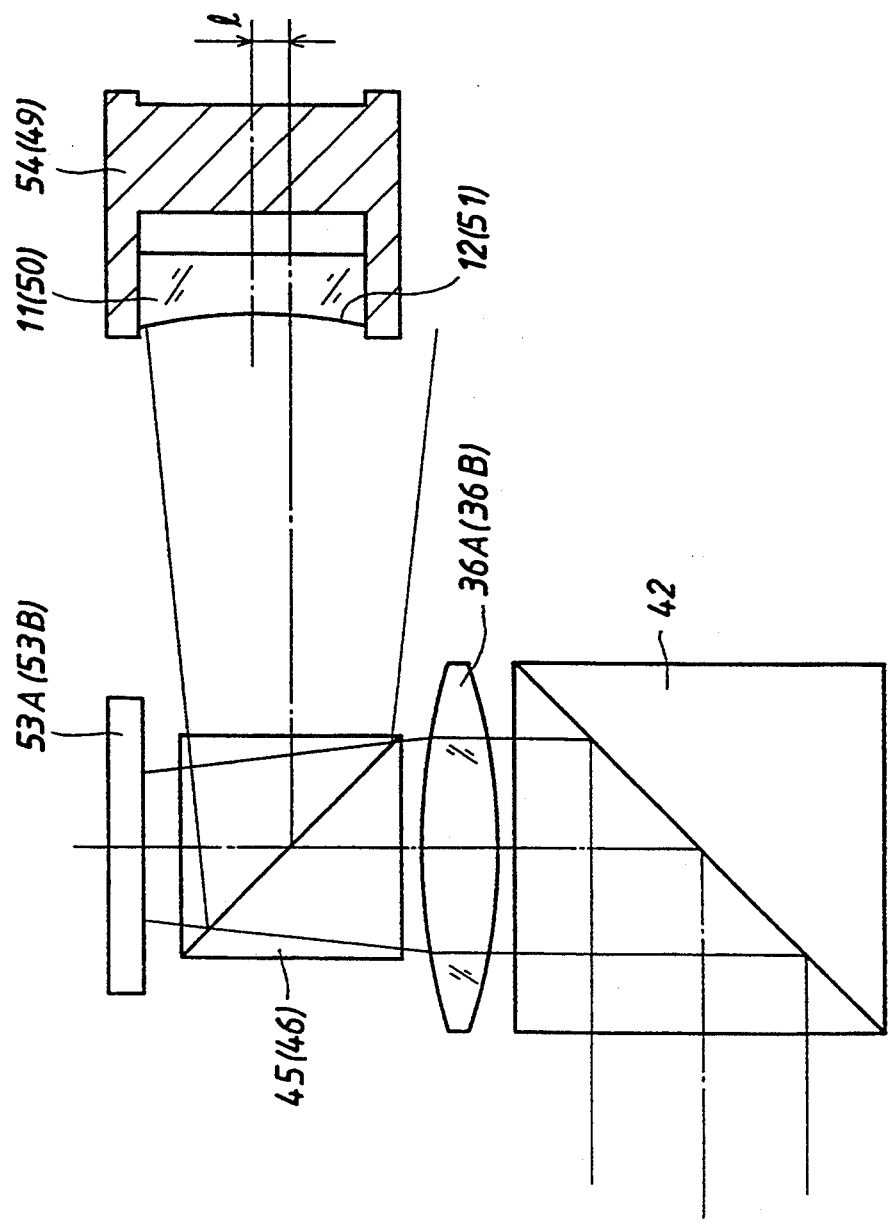
FIG. 10 is an illustration of a determination of the shape of a concave surface in the fourth embodiment.

Thus, in the third embodiment, the wave front interferometer for determining the shape of a convex surface has its elements disposed as is shown in FIG. 8. Larger distances both between the condenser lens (36A) and the unpolarized light beam splitter (45), and between the condenser lens (36B) and the unpolarized light beam splitter (46) make it possible to determine the shape of a convex surface with a larger radius of curvature. It is also possible to determine the shape of a concave surface by positioning the elements so that the reflected light from both the phase conjugate mirror (53A) and that from the phase conjugate mirror (53B) may focus on points which deviate by a quantity of 1 perpendicular to the optical axis from the center of curvature of both the surface (12) and the reference surface (51). This is shown in FIG. 9 (showing divergent light incident on the phase conjugate mirrors (53A) and (53B)) and in FIG. 10 (showing convergent light incident on the phase conjugate mirrors (53A) and 53B)). FIGS. 9 and 10 are illustrations of a single arrangement equally applicable to both the surface to be measured (12) and the reference surface (51).

In the third embodiment, the reference surface is prepared on the basis of the surface to be measured. Consequently, it is possible to determine the shape not only of a spherical surface but also of a non-spherical surface without changing the construction of the optical elements.

Fourth Embodiment

Figure 11:
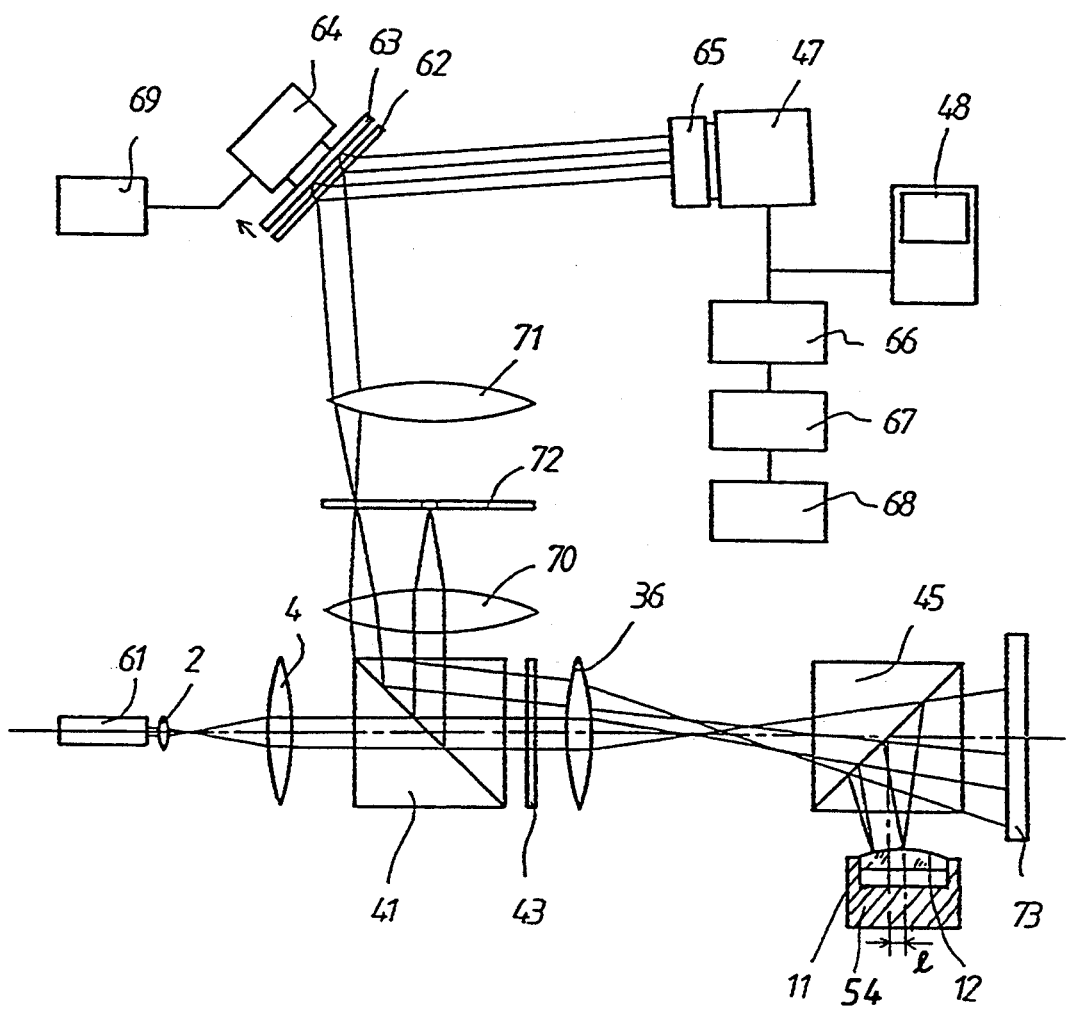
FIG. 11 is a schematic illustration of a wave front interferometer in accordance with the fourth embodiment of the present invention.

FIG. 11 is a schematic illustration of a wave front interferometer in accordance with the fourth embodiment of the present invention. This wave front interferometer employs a self-pumping phase conjugate mirror.

In FIG. 11, a laser source (61) is an Ar+ laser device which emits a P-polarized laser beam. Along the path of the laser beam are disposed a condenser lens (2), a collimator lens (4), a polarized light beam splitter (41), a quarter undulation plate (43), a condenser lens (36), an unpolarized light beam splitter (45), and a self-pumping phase conjugate mirror (73). The self-pumping phase conjugate mirror (73) is made of a $BaTiO_3$ crystal. Along the path of deflected light from the unpolarized light beam splitter (45) are disposed the lens to be examined (11) and a support member (54) for supporting the lens (11). Along the path of deflected light from the polarized light beam splitter (41) a condenser lens (70), a mask (72) for shading the light in and around the optical axis, and a collimator lens (71) are positioned. The mask (72) is inserted at the focusing position of the condenser lens (70).

In FIG. 11, the reference numeral (62) indicates a plane-parallel plate for dividing a laser beam reflected on an optical surface to be measured (12). The plane-parallel plate (62) is coated so as to reflect and transmit the incident light at an equal intensity. Behind the plane-parallel plate (62), a planar mirror (63) is positioned. The planar mirror (63) can be moved by means of a piezo electric element (64) along the arrow marked in FIG. 11. The piezo electric element (64) is driven by a piezo electric driver circuit (69). The reference numeral (65) indicates a condenser lens for condensing a parallel beam reflected on the planar mirror (63). The reference numeral (66) indicates an image memory for storing an image of interference fringes taken by the telecamera (47), which is electrically connected to the image memory (66). The image memory (66) is electrically connected to a mathematical processor (67) for receiving image signals stored in the image memory (66), computing phase changes at certain points on the interference fringes, and calculating height levels at these points from the phase changes. The mathematical processor (67) is connected to a printer (68) for printing the results of the calculated height levels.

Before an actual measurement, the support member is adjusted so that the centripetal point of a surface (12) is adjusted by a small quantity of 1 from the optical axis of the wave front interferometer.

In the above construction, a laser beam emitted from the Ar+ laser (61) focuses after passing through the condenser lens (2), then diverges, becomes parallel through the collimator lens (4), and reaches the polarized light beam splitter (41). Since the laser beam has P-polarity, it is transmitted through the polarized light beam splitter (41), enters the quarter undulation plate (43) to be circularly polarized, is condensed by the condenser lens (36), and enters the unpolarized light beam splitter (45). The entering beam is partly transmitted by the unpolarized light beam splitter (45) and is incident on the phase conjugate mirror (73). Since the phase conjugate mirror (73) is self-pumping, mere incidence of the laser beam leads to the generation of a phase conjugate wave in the form of reflected light. When a divergent beam is incident on the phase conjugate mirror (73), the light converges on reflection and re-enters the unpolarized light beam splitter (45).

As it re-enters the unpolarized light beam splitter (45), the beam is partly transmitted through the unpolarrized beam splitter (45) and travels backward along the path of incidence on the phase conjugate mirror (73), passing through the condenser lens (36) and entering the quarter undulation plate (43). In the quarter undulation plate (43), the beam changes its polarity from circularly polarized light to S-polarized light, and then enters the polarized light beam splitter (41). The S-polarized light beam is deflected by the polarized light beam splitter (41) and enters the condenser lens (70). The condenser lens (70) focuses the beam on the optical axis where the mask (72) is located, thereby shading the beam as it enters the condenser lens (70).

As the beam re-enters the unpolarized light beam splitter (45), the beam is partly deflected by the unpolarized light beam splitter (45) and is incident on the surface to be measured (12). The incident beam is partly reflected by the surface (12). Since the centripetal point of the surface (12) deviates from the optical axis, the partly reflected light beam travels along a path different from the incident path, enters the unpolarized light beam splitter (45), is partly deflected there, and is incident on the phase conjugate mirror (73). Then, the phase conjugate mirror (73) generates a phase conjugate wave as reflected light. When the incident light diverges, the reflected light is convergent. The reflected light beam enters and is partly transmitted through the unpolarized light beam splitter (45), and then enters and becomes parallel through the condenser lens (36). The parallel beam enters the quarter undulation plate (43), changing its polarity from circularly polarized light to S-polarized light, and then enters the polarized light beam splitter (41). The light beam with S polarity is deflected by the polarized light beam splitter (41) and enters the condenser lens (70), which focuses the beam on a position deviating from the optical axis because of the deviation of the centripetal point of the surface (12) from the optical axis. Therefore, the mask (72) does not shade the focused beam.

The focused beam then diverges, is made parallel by the colimator lens (71), and enters the plane-parallel plate (62), where the beam is partly reflected and partly transmitted. The beam reflected by the plane-parallel plate (62) proceeds to the lens (65). The beam transmitted through the plane-parallel plate (62) reflects on the mirror (64) positioned behind and parallel to the plane-parallel plate (62), is again transmitted through the plane-parallel plate (62), and proceeds to the lens (65).

As they proceed to the lens (65), both of the two kinds of beams above are parallel and deviate from the optical axis at a perpendicular angle to each other because of the different paths. Therefore, they interfere with each other, enter and condense through the lens (65), and proceed to the telecamera (47). The interference causes interference fringes which can be observed by the telecamera (47).

When the piezo electric element (64) is driven by the piezo electric driver circuit (69) so that it moves the planar mirror (63) along the arrow, a difference in length between the optical paths of the beam reflected by the plane-parallel plate (62) and the beam reflected by the planar mirror (63) is one-Nth (e.g., N=4) of the wave length of the laser light being used, the change in the distance of the optical path of the beam reflected on the planar mirror (63) causes a change in the phase of the interference fringes observed on the telecamera (47). This operation is repeated N times and each image of observed interference fringes is stored in the image memory (66) connected to the telecamera (47). The intensity (I) of each picture element in each of the N images stored in the image memory (66) can be substituted into the following equation (1) to compute the wave front w by means of the mathematical processor (67).

Equation (1)

Then the following equation (2), Zernike polynomial, is used to analize the wave front w.

Equation (2)

The tilt and loss of focus caused by alignment errors and astigmatism, coma, and spherical aberration caused by spherical errors are obtained from the coefficients given in Equation (2). Surface precision is obtained by calculating, from the shape of a wave front, the difference between the maximum and minimum values (P−V) and the RMS value. The values of the astigmatism, coma, spherical aberrations, and other results are output by the printer (68).

Thus, in the fourth embodiment, the wave front interferometer for determining the shape of a convex surface has its elements arranged as shown in FIG. 11. A larger distance between the condenser lens (36) and the beam splitter (45) makes it possible to determine the shape of a convex surface with a larger radius of curvature. It is also possible to determine the shape of a concave surface by positioning the elements so that the reflected light from the phase conjugate mirror (73) focuses at a point deviating from the center of curvature of the surface (12) by a quantity of 1 perpendicular to the optical axis, as is shown in FIG. (12) (showing divergent light incident on the phase conjugate mirror (73) and in FIG. 13 (showing convergent light incident on the phase conjugate mirror (73)).

In the fourth embodiment, a precise determination of the shape is possible because it is based on a multiplicity of interference fringes.

Figure 14:
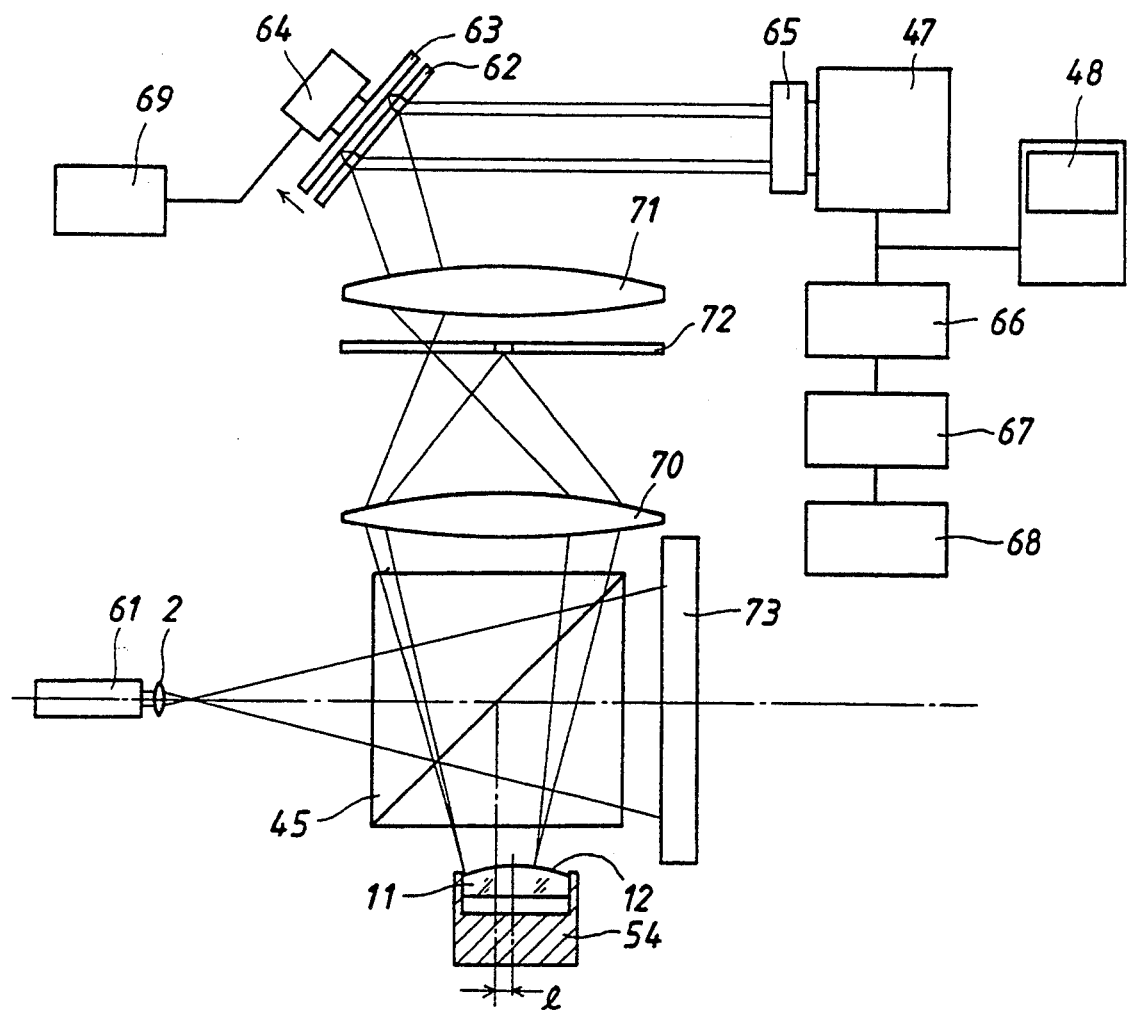
FIG. 14 is an illustration of a modification of the fourth embodiment.

A precise determination of the shape is also possible when the arrangement of elements in FIG. 11 is modified to the one shown in FIG. 14, in which the collimator lens (4), the polarized light beam splitter (41), the quarter undulation plate (43), and the condenser lens (36) are removed from FIG. 11.

In FIG. 14, a laser beam coming through the condenser lens (2) enters the unpolarized light beam splitter (45) as a divergent beam and is partly incident on the surface (12), as described in FIG. 11. The incident beam is partly reflected on the surface (12), is transmitted through the unpolarized light beam splitter (45), and converges in the condenser lens (70). The convergent beam is transmitted through the mask (72), in made parallel by the collimator lens (71), and is incident on the plane-parallel plate (62).

The laser beam coming through the condenser lens (2) enters and is partly deflected by the unpolarized light beam splitter (45), enters the condenser lens (70), and condenses on that point of the mask (72) which shades the light. Consequently, as is the case with FIG. 11, the partly deflected beam does not reach the collimator lens (71). The other construction of the modified fourth embodiment shown in FIG. 14 is the same as that shown in FIG. 11 and therefore description thereof is omitted.

Fifth Embodiment

Figure 15:
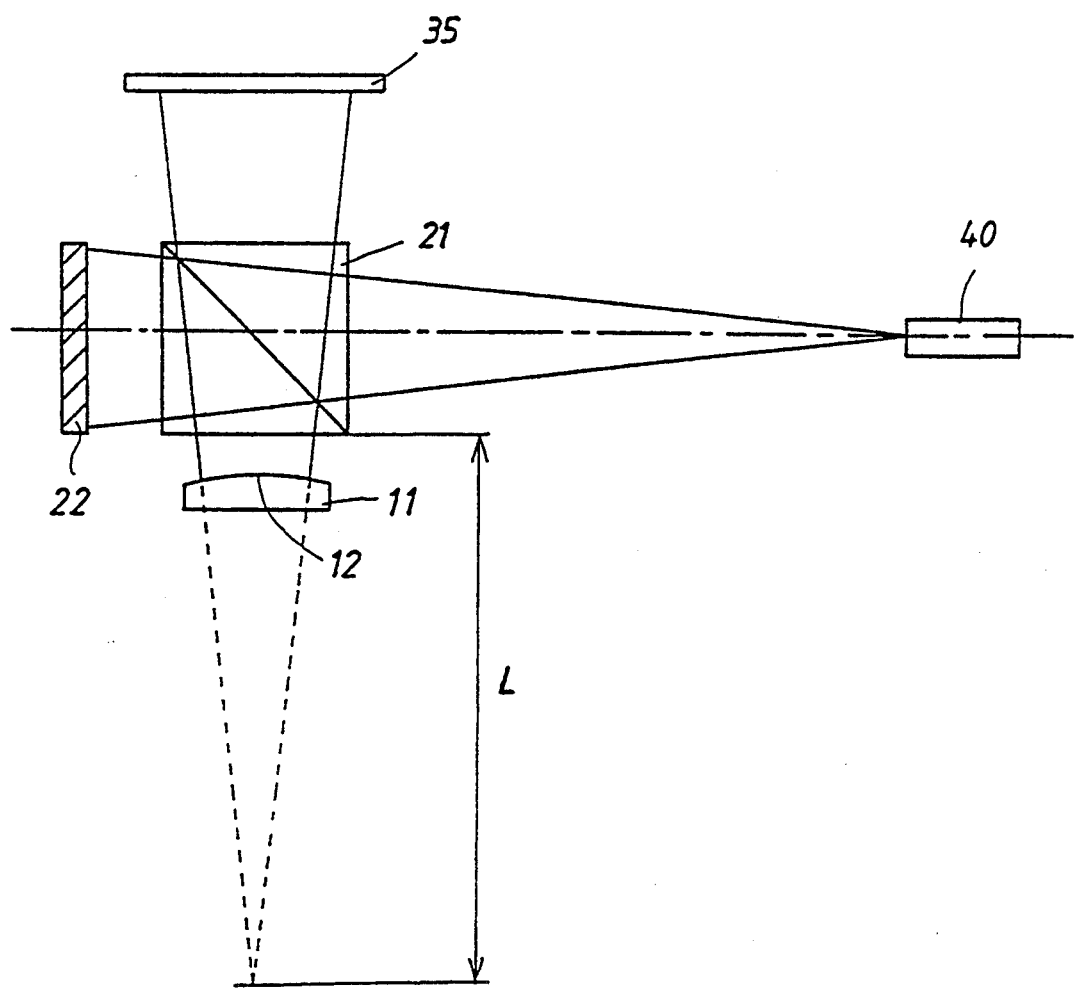
FIG. 15 is a schematic illustration of a wave front interferometer in accordance with the fifth embodiment of the present invention.

FIG. 15 is a schematic illustration of a wave front interferometer in accordance with the fifth embodiment of the present invention.

In the fifth embodiment, a self-pumping phase conjugate mirror is used. Along the path from a laser source (40) comprising He-Cd laser tube are positioned a beam splitter (21) and a phase conjugate mirror (22). The phase conjugate mirror (22) is self-pumping and made of SBN ($Sr_{1-x}Ba_xNb_2O_6$). A lens to be examined (11) and a screen (35) for observing interference fringes are positioned on either side of the phase conjugate mirror (22).

In the above construction, a beam emitted from the laser source (40) enters the beam splitter (21) and is partly transmitted through it until it is incident on the phase conjugate mirror (22). When the incident beam diverges, the phase conjugate mirror (22) reflects it as a phase conjugate wave and makes it converge. The convergent beam travels backward along the same path as the incident beam. Accordingly, the convergent reflected beam again enters the beam splitter (21), where it is travelling direction is bent at a right angle. Then the beam is incident on the optical surface to be measured (12), is partly reflected on the surface (12), and partly transmitted through the beam splitter (21), and then is incident on the screen (35).

At the same time, another part of the beam emitted from the laser source (40) and then incident on the beam splitter (21) is deflected by the beam splitter (21) to be incident on the screen (35). This directly incident beam deflected by the beam splitter (21) and the indirectly incident beam reflected by the surface (12) interfere with each other on the screen (35) to form interference fringes. From observation of the interference fringes the shape of the surface (12) can be determined.

The measurable size of the radius of curvature (R) of the surface (12) depends on the distance (L in FIG. 15) from the focusing point of the beam bent by the beam splitter (21) to that face of the beam splitter (21) which faces the surface (12). Because of the above characteristics of the phase conjugate mirror (22), further separation of both the beam splitter (21) and the phase conjugate mirror (22) from the laser source (40) (or, of the laser source (40) from the beam splitter (21)) results in lengthening the beam bent by the beam splitter (21), (i.e., L in FIG. 15). Consequently, if the distance between the laser source (40) and the beam splitter (21) is large enough, it is possible to determine the shape of a convex surface (12) with a large radius of curvature.

However, if the angle of divergence of the beam emitted from the laser source is unfavorably large in comparison with the size of the beam splitter (21), a portion of the circumference of the beam may be eliminated by the beam splitter (21). To prevent this, an optical system may be inserted between the laser source (40) and the beam splitter (21) to convert the angle of divergence. Such an insertion helps prevent the loss of the laser beam without influencing the performance of the wave front interferometer in the fifth embodiment.

Thus, in the fifth embodiment, the small number of components makes the wave front interferometer inexpensive and its construction simple. In addition, greater precision of measurement results from the ability to generate a large quantity of light interference fringes, because the light is reflected by the surface but not by the phase conjugate mirror.

Sixth Embodiment

Figure 16:
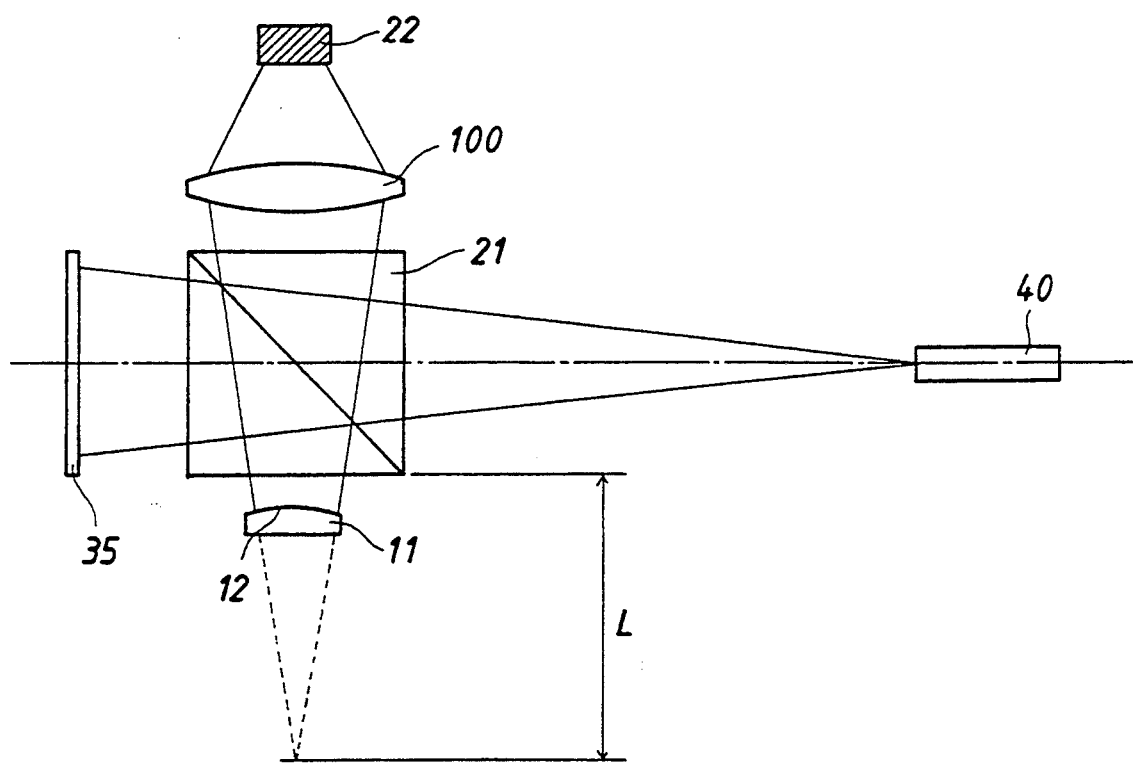
FIG. 16 is a schematic illustration of a wave front interferometer in accordance with the sixth embodiment of the present invention.

FIG. 16 is a schematic illustration of a wave front interferometer in accordance with the sixth embodiment of the present invention.

Referring to FIG. 16, the reference numeral (100) indicates a lens for condensing laser light. Except for the fact that the phase conjugate mirror (22) exchanges positions with the screen (35), the construction of the sixth embodiment is otherwise the same as the fifth embodiment and therefore description thereof is omitted.

In FIG. 16, a beam emitted from the laser source (40) enters the beam splitter (21) and is partly transmitted through it to be incident on the screen (35). The beam is emitted from the laser source (40) and enters the beam splitter (21). It is also partly deflected by the beam splitter (21), enters the lens (100), passes out of the lens (100) as a convergent beam, and then is incident on the phase conjugate mirror (22). The characteristics of a phase conjugate mirror enable it to reflect the incident convergent beam as a phase conjugate wave and turn it into a divergent beam that traces the incident path backward. In other words, the divergent beam reflected on the phase conjugate mirror (22) again enters the lens (100), passes out of the lens (100) as a convergent beam, enters the beam splitter (21), is partly transmitted through it, and is incident on the surface (12) at a perpendicular angle to the lens to be examined (11). Then the incident beam is partly reflected by the surface (12), then by the beam splitter (21), and reaches the screen (35). On the screen (35), the direct beam emitted from the laser source (40) and the reflected beam from the surface (12) interfere with each other to form interference fringes. Observation of the shape of the interference fringes helps determine the shape of the surface (12).

The measurable size of the radius of curvature (R) of the surface (12) depends on the distance (L in FIG. 16) from that face of the beam splitter (21) facing the surface (12) to the focusing point of the beam transmitted through the beam splitter (21) and then entering the surface (12). Because of the above characteristics of the phase conjugate mirror (22), a further separation of both the beam splitter (21) and the phase conjugate mirror (22) from the laser source (40) (or, of the laser source (40) from the beam splitter (21)) results in transmitting a larger length of the beam through the beam splitter (21) which then enters the surface (12) (i.e., L in FIG. 16). Consequently, if the distance between the laser source (40) and the beam splitter (21) is large enough, it is possible to determine the shape of a convex surface (12) with a large radius of curvature. Though a large distance between the laser source (40) and the beam splitter (21) results in a larger diameter for the beam incident on the phase conjugate mirror (22), diameter can be made smaller by shifting the phase conjugate mirror (22) to the vicinity of the focusing point of the beam in the lens (100).

Thus, in the fifth embodiment, the small number of constitutional components makes the wave front interferometer inexpensive and its construction simple. In addition, it is possible to generate a large quantity of light interference fringes, because the light is reflected from the surface but not on to the phase conjugate mirror.

Furthermore, the insertion of the lens (100) between the beam splitter (21) and the phase conjugate mirror (22) makes the diameter of the beam incident on the phase conjugate mirror (22) small, and, consequently, determination of the shape of the optical surface can be performed with a small phase conjugate mirror. This possibility is equally effective in the other embodiments.

In the above six embodiments and their modifications, two cases are described, including the case of a condenser lens in front of a laser source and the another which was not. As explained in the fifth embodiment, where such a condenser lens is to be positioned depends on the divergent angle of divergence (or convergence) of the laser beam emitted from the laser source.

What is claimed is:

1. A wave front interferometer for determining the shape of an optical surface from interference fringes, comprising: a light source for projecting an irradiating light beam along a beam path; a beam splitter and a phase conjugate mirror in an optical path from the light source to an optical surface, the phase conjugate mirror being receptive of the irradiating light beam from the light source through the beam splitter and being effective to reflect the irradiating light beam as a reflected light beam in the form of a phase conjugate wave, the reflected light beam travelling from the phase conjugate mirror back along the same beam path as the irradiating light beam so that the distance between the phase conjugate mirror and a focus point of the reflected light beam increases as the distance between the light source and the beam splitter and/or the phase conjugate mirror increases to thereby enable measurement of a surface having a large radius of curvature, the beam splitter being effective to bend the phase conjugate wave so as to become incident and reflected as a surface reflected beam by the surface; whereby the surface reflected beam from the surface is used as a measurement wave front to determine the shape of the surface.

2. A wave front interferometer according to claim 1; further comprising a lens between the beam splitter and the phase conjugate mirror, the lens being effective to reduce the cross section of the irradiating light beam from the beam splitter and impinging on the phase conjugate mirror.

3. A wave front interferometer according to claim 1; further comprising adjusting means for adjusting the distance between at least two of the phase conjugate mirror, the beam splitter and the light source, depending on the radius of curvature of the surface.

4. A wave front interferometer according to claim 3; wherein the adjusting means includes means for adjustably shifting at least one of the phase conjugate mirror, the beam splitter and the light source to thereby adjust the distance between at least two of the phase conjugate mirror, the beam splitter and the light source.

5. A wave front interferometer for determining the shape of an optical surface from interference fringes formed through the interference action of an observation mechanism, comprising: a light source; a beam splitter for dividing a light beam from the light source; and a phase conjugate mirror for receiving a divided light beam through the beam splitter in an optical path from the light source to an optical surface, the phase conjugate mirror being positioned to receive the light beam along a beam path from the light source and reflect the light beam to the beam splitter so that the surface receives the light beam from the beam splitter and reflects the light beam through the beam splitter to the observation mechanism, the phase conjugate mirror being effective to reflect the light beam back along the beam path so that the distance of a focus point of the light beam reflected from the phase conjugate mirror increases as the distance between the light source and the beam splitter and/or the phase conjugate mirror increases thereby enabling measurement of a surface having a large radius of curvature, and wherein the observation mechanism further receives a light beam directly from the light source.

6. A wave front interferometer for determining the shape of an optical surface from interference fringes formed through interference action on an observation mechanism, comprising: a light source; a beam splitter for dividing a light beam from the light source; and a phase conjugate mirror for receiving a divided light beam through the beam splitter in an optical path from the light source to an optical surface, the phase conjugate mirror being positioned to receive the light beam from the light source and reflect the light beam to the beam splitter so that the surface receives the light beam from the beam splitter and reflects the light beam through the beam splitter to the observation mechanism, the phase conjugate mirror being effective to reflect the light beam back along the beam path so that the distance of a focus point of the light beam reflected from the phase conjugate mirror increases as the distance between the light source and the beam splitter and/or the phase conjugate mirror increases thereby enabling measurement of a surface having a large radius of curvature, the observation mechanism further receives a light beam indirectly from the light source after indirectly irradiating the light beam from the light source onto a reference surface.

7. A wave front interferometer according to claim 6; wherein both the surface and the reference surface are offset by the same amount in the same direction from the optical axis of the wave front interferometer; the wave front interferometer further comprising a mask for shading a light beam along the optical axis so that the light beam from the light source is reflected through the beam splitter to the phase conjugate mirror and is reflected on the phase conjugate mirror, transmitted through the beam splitter and then focused on and shaded by the mask.

8. A wave front interferometer for determining the shape of an optical surface from interference fringes formed on an observation mechanism by dividing a measurement wave front in two and transversely splitting the two parts way from each other, comprising: a beam splitter and a phase conjugate mirror lying in an optical path from a light source to an optical surface, the phase conjugate mirror being positioned to receive the light beam through the beam splitter and reflect the light beam from the light source so that the light beam bends at the beam splitter and impinges and reflects on the surface as reflected light, the phase conjugate mirror being effective to reflect the light beam back along the beam path so that the distance of the focus point of the light beam reflected from the phase conjugate mirror increases as the distance between the light source and the beam splitter and/or the phase conjugate mirror increases to thereby enable measurement of a surface having a large radius of curvature, and wherein the reflected light is further transmitted through the beam splitter and reaches the observation mechanism.

9. A wave front interferometer according to claim 8; wherein the surface is offset from the optical axis of the wave front interferometer; and the wave front interferometer further comprises a mask for shading a light beam along the optical axis so that the light beam from the light source is reflected through the beam splitter to the phase conjugate mirror and is reflected on the phase conjugate mirror, transmitted through the beam splitter and then focused on and shaded by the mask.

10. A wave front interferometer for determining a shape of an optical surface from interference fringes, comprising: a light source for projecting a light beam; a beam splitter disposed in an optical path between the light source and an optical surface, the beam splitter being effective to bend a phase conjugate wave to become incident on the optical surface and to be reflected from the optical surface as a reflected beam; and a phase conjugate mirror disposed in the optical path to receive the light beam along a beam path through the beam splitter and to reflect the light beam as the phase conjugate wave, the phase conjugate mirror reflecting the light beam back along the same beam path so that the distance of the focus point of the light beam reflected from the phase conjugate mirror increases as the distance between the light source and the beam splitter and/or the phase conjugate mirror increases to thereby enable measurement of a surface having a large radius of curvature; whereby the reflected beam from the optical surface is effective as a measurement wave for determining the shape of the optical surface.

11. A wave front interferometer according to claim 10; further comprising a lens disposed between the beam splitter and the phase conjugate mirror for reducing the cross-section of the light beam reflected from the beam splitter and impinging on the phase conjugate mirror.

12. A wave front interferometer according to claim 10; further comprising adjusting means for adjusting the distance between at least two of the phase conjugate mirror, the beam splitter and the light source depending on a radius of curvature of the optical surface.

13. A wave front interferometer according to claim 10; further comprising observation means receptive of the reflected beam from the optical surface and the light beam from the light source for enabling observation of interference fringes between the reflected beam and the light beam.

14. A wave front interferometer according to claim 13; further comprising a reference surface receptive of the light beam for reflecting the light beam to the observation means.

15. A wave front interferometer according to claim 14; wherein the optical surface and the reference surface are each offset from the optical axis of the wave front interferometer by the same distance and in the same direction.

16. A wave front interferometer according to claim 10; further comprising a mask for shading a light beam along the optical axis of the interferometer so that the light beam from the light source is reflected from the beam splitter to the phase conjugate mirror and is reflected by the phase conjugate mirror, transmitted through the beam splitter, and then focused on and shaded by the mask.

* * * * *